March 17, 1964  R. A. PLOWICK  3,125,742
PATROL VEHICLE ACCESSORY CONTROL DESK
Filed Oct. 24, 1961  3 Sheets-Sheet 1
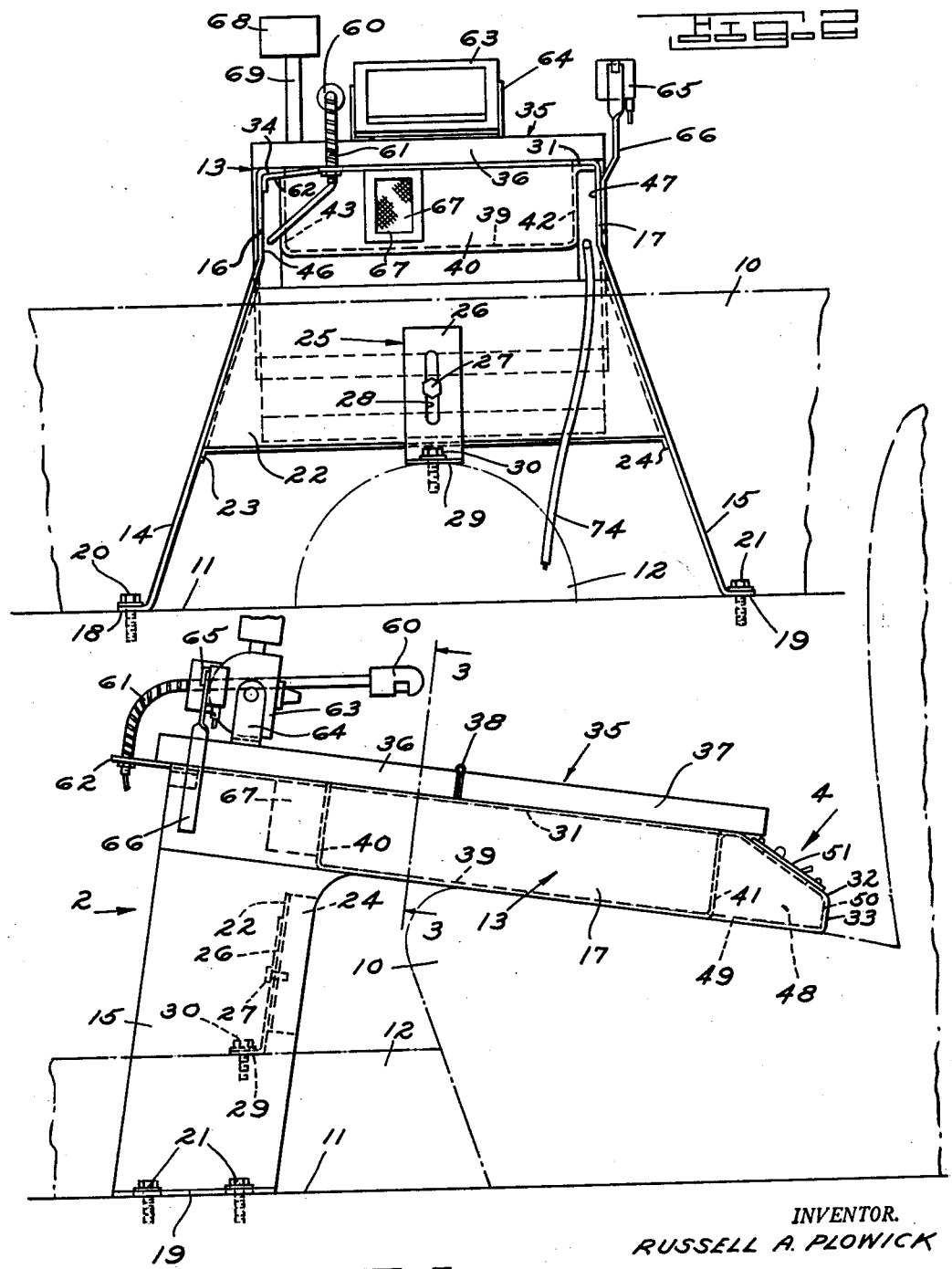
INVENTOR.
RUSSELL A. PLOWICK
BY
Donnelly, Mentag & Harrington
ATTORNEYS

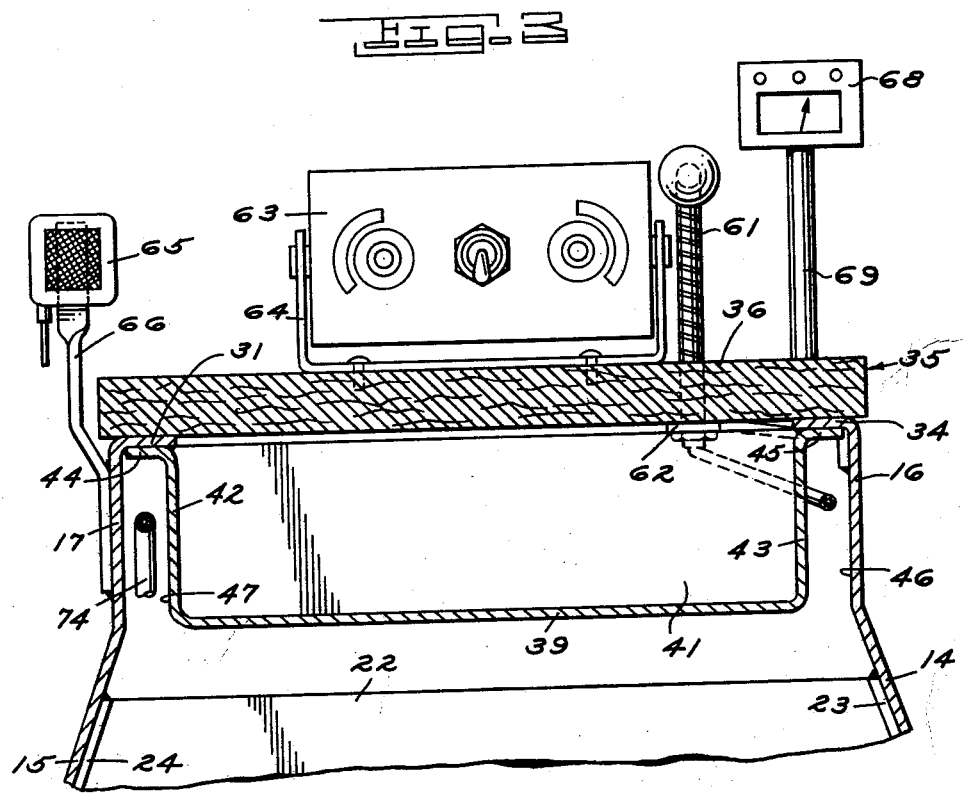
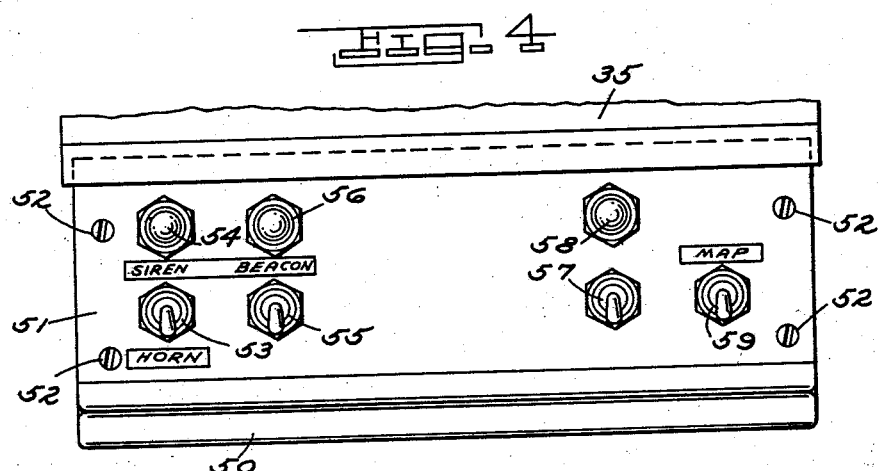

March 17, 1964 R. A. PLOWICK 3,125,742
PATROL VEHICLE ACCESSORY CONTROL DESK
Filed Oct. 24, 1961 3 Sheets-Sheet 3

INVENTOR.
RUSSELL A. PLOWICK
BY
Donnelly, Mentag & Harrington
ATTORNEYS

United States Patent Office 3,125,742
Patented Mar. 17, 1964

3,125,742
PATROL VEHICLE ACCESSORY CONTROL DESK
Russell A. Plowick, 38802 Hilldale,
Mount Clemens, Mich.
Filed Oct. 24, 1961, Ser. No. 147,267
4 Claims. (Cl. 340—74)

This invention relates to a novel automobile control desk, and more particularly, to an automobile accessory control desk particularly adapted for use in a police patrol vehicle or the like.

Police patrol vehicles and the like are provided with special accessories and equipment, as for example, flasher lights, sirens and so forth which must be provided with special wiring and control switches for selective operation of the same. It is customary to replace such police patrol vehicles at certain periods as for example, every few years, and it is expensive to install the required special wiring and control system for such aforementioned accessories or attachments in these vehicles. Accordingly, it is the primary object of the present invention to provide a novel automobile accessory control desk especially adapted for use in police patrol automobiles or the like, and which includes a control circuit and control switches and apparatus for selective operation of the various accessories and attachments employed on a police patrol automobile, and which further functions as a storage and writing desk for the police officers manning the patrol automobile.

It is another object of the present invention to provide an automobile accessory control desk for a police patrol automobile or the like which is simple and compact in construction, economical of manufacture, efficient in operation and which may be quickly and easily changed from one automobile to another automobile in a minimum of time and with a minimum of labor.

It is a further object of the present invention to provide a novel automobile accessory control desk for a police patrol automobile which incorporates a control system and wiring for the special accessories and attachments used on such an automobile, whereby the cost of equipping such an automobile with such accessories is reduced because no special wiring is required to be installed in the automobile, and the control desk may be quickly and and easily detached from an old automobile for further use in a new automobile.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

In the drawing:

FIG. 1 is a side elevation view of an auto desk made in accordance with the principles of the present invention;

FIG. 2 is a front elevation view of the structure illustrated in FIG. 1, taken from the left side thereof, and looking in the direction of the arrow marked "2";

FIG. 3 is an enlarged, fragmentary, elevational sectional view of the structure illustrated in FIG. 1, taken along line 3—3 and looking in the direction of the arrows;

FIG. 4 is an enlarged, fragmentary, top plan view of the rear portion of the structure illustrated in FIG. 1, taken from the right side thereof, and looking in the direction of the arrow marked "4"; and, FIG. 5 is a schematic diagram of the control circuit of the auto desk shown in FIGS. 1 through 4.

Figure 5:
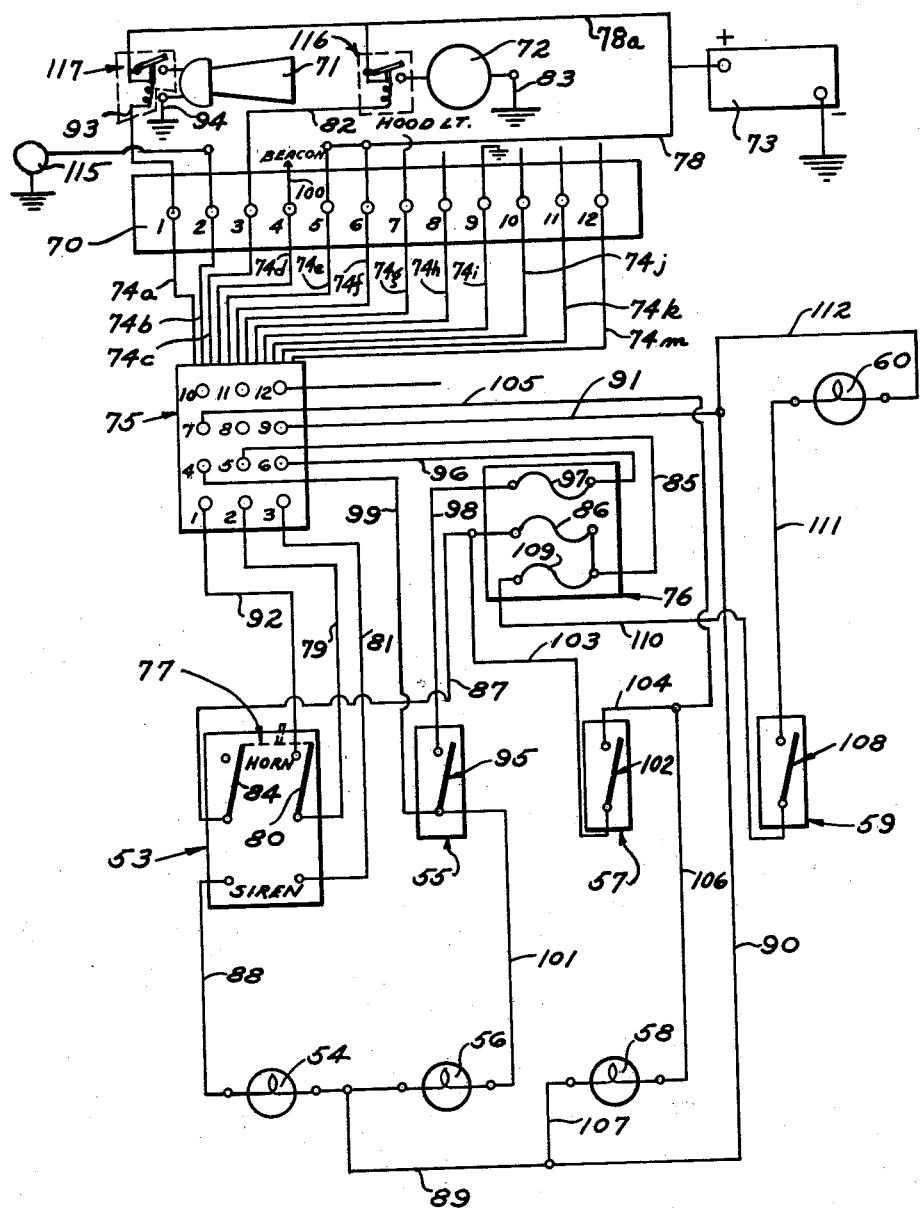

Referring now to the drawings and in particular to FIGS. 1, 2 and 3, the numeral 10 indicates the front seat cushion of an automobile and the numeral 11 indicates the front floor area in an automobile. The numeral 12 indicates the usual hump in the floor line of an automobile made by the automobile's transmission. The automobile desk of the present invention comprises a body portion 13 which is adapted to extend over the front seat cushion 10 of an automobile and to be supported at the forward end thereof by means of a pair of spaced apart supporting legs 14 and 15.

As shown in FIGS. 1, 2 and 3, the desk body 13 includes the two vertical side walls 16 and 17. It will be seen that the two supporting legs 14 and 15 are integrally connected at the upper ends thereof to the front lower ends of the side walls 16 and 17. As best seen in FIG. 2, the supporting legs 14 and 15 slope downwardly and outwardly from the lower ends of the side walls 16 and 17, respectively, so as to straddle the transmission and driveshaft hump 12 formed in the front end of the car or automobile. The lower ends of the supporting legs 14 and 15 are turned outwardly as indicated by the numerals 18 and 19, respectively, so as to form a pair of floor mounting flanges. The flanges 18 and 19 may be fixedly secured to the automobile floor 11 by any suitable means as for example, by means of the self threading metal screws 20 and 21, respectively.

As shown in FIGS. 1, 2, and 3, the supporting legs 14 and 15 are inter-connected by a brace or stiffener comprising the substantially vertical plate 22 which has the side edges thereof turned backwardly to form the flanges 23 and 24 which are fixedly secured to the inside of the legs 14 and 15 by any suitable means as by welding. The auto desk of the present invention is adapted to be further secured in place to the floor of an automobile by means of the retainer bracket generally indicated by the numeral 25. The bracket 25 includes the plate 26 which is adjustably secured to the front side of the brace plate 22 at a centrally disposed position by any suitable means, as by the bolt 27 which passes through the slot 28 in the plate 26. The lower end of the plate 26 is turned outwardly forwardly to form the flange 29 and this flange is fixedly secured to the portion 12 of the car floor by any suitable means, as by means of the self threading metal screw 30.

As shown in FIGS. 1, 2 and 3, the upper edge of the desk body side wall 17 is folded over inwardly to form the flange 31. As shown in FIG. 1, the rear end of the side wall 17 is provided with a sloping end corner shape indicated by the numeral 32. The lower end of the sloping portion 32 terminates at the upper end of the extreme straight rear edge 33. The other desk body side wall 16 is provided with a similar flange 34 along the upper edge thereof and the rear end thereof is tapered in the same manner as the side wall 17 at the rear end thereof. As shown in FIGS. 1 through 4, a table top generally indicated by the numeral 35 is fixedly mounted on the flanges 31 and 34 by any suitable means. The table top 35 includes the front portion 36 which is fixedly secured to the flanges 31 and 34 and the rear portion 37 which is hingedly connected to the rear end of the portion 36 by means of the hinge 38. The rear portion 35 is swingable upwardly to permit access to the inside of the desk as more fully explained hereinafter. The rear portion 35 of the desk top extends rearwardly and terminates adjacent the front end of the tapered rear end of the desk as shown in FIG. 1.

The desk of the present invention is provided with a storage compartment below the top 35 and which is accessible when the rear top portion 37 is swung upwardly about the hinge 38. As shown in FIGS. 1, 2 and 3, the storage compartment is provided with the bottom wall 39 which is spaced downwardly from the flanges 31 and 34. The storage compartment is enclosed at the forward end thereof by means of the vertical wall 40 and it is enclosed at the rear end thereof by means of the vertical wall 41. The walls 40 and 41 extend upwardly to the underside of the flanges 31 and 34. The storage compartment is further provided with the side walls 42 and 43 and these side walls extend upwardly and have the upper edges folded over outwardly sidewardly to form the flanges 44 and 45. The flanges 44 and 45 are fixedly secured to the flanges 31 and 34 by any suitable means as by welding.

As shown in FIGS. 2 and 3, the side walls 42 and 43 of the storage compartment are spaced inwardly from the desk side walls 16 and 17 to provide the longitudinally disposed passageways for wiring compartments 46 and 47. The wiring passageways 46 and 47 are open at the front end thereof and communicate at the rear end thereof with the transverse wiring compartment 48 which is formed at the rear end of the desk, as shown in FIG. 1. The wiring compartment 48 is enclosed on the lower end thereof by means of a suitable wall as 49 and at the rear end thereof by means of the wall 50, and at the front end thereof by means of the wall 41. The top of the compartment 48 is enclosed by the access panel 51 which is adapted to be secured in place by means of the screws 52.

As shown in FIGS. 4 and 5 a double pole, double throw switch 53 is mounted on the left side of the switch panel 51 for controlling the operation of the patrol car horn and siren. A signal light 54 for indicating that the siren is energized is also mounted on the switch panel 51 immediately above the switch 53. The numeral 55 indicates a single pole, single throw switch for operating the flasher beacon of the patrol car and the numeral 56 indicates a signal light for showing that the beacon is energized. The switch panel further includes the switch 57 which is a single pole, single throw switch for energizing the patrol car's hood light. The hood light is the light normally mounted on the hood of the patrol car and which contains the word "Police." The numeral 58 indicates a signal light mounted on the switch panel 51 for showing that the hood light is energized. The switch 59 on the panel 51 is a single pole, single throw switch for energizing the desk light 60 which is mounted on the front end of the desk by means of the flexible conduit 61 and the bracket 62. The bracket 62 is fixedly connected to the desk by any suitable means as by welding.

The auto desk of the present invention is adapted to support and carry other attachments which are normally used in a patrol car, as for example the radio 63, which is operatively mounted on the bracket 64. The bracket 64 may be fixedly secured to the table top 36 by any suitable means.

The auto desk of the present invention is illustrated as supporting a microphone 65 for use in connection with the radio communications of the patrol car. The auto desk has fixedly mounted thereon the bracket 66 on which the microphone is adapted to be hung. The speaker for the radio 63 is indicated by the numeral 67 in FIGS. 1 and 2, and is shown as being fixedly mounted to the front underside of the table top by any suitable means. The auto desk of the present invention is illustrated as further supporting a radar meter 68 which is carried by an adjustable support rod 69. The adjustable support rod 69 is fixedly secured to the front end of the table top 35. The aforementioned accessories which are mounted on the table and which are mounted on other parts of the automobile but which are controlled by the switches on the table are electrically interconnected and FIG. 5 shows an illustrative wiring system which includes the aforementioned switches mounted on the auto desk.

The control system of the auto desk includes a terminal strip 70 as shown in FIG. 5, and which is adapted to be mounted on the fire wall of an automobile under the hood on the engine side of the fire wall. The use of the terminal strip 70 makes it possible to connect the various attachments added to a patrol car without putting special wiring into an automobile for these attachments. For example, the usual horn 71 may be wired so that it may be energized by means of the switch 53 and the usual horn button 115, and siren 72 may be connected to the switch 53 which is on the auto desk, whereby it is not necessary to mount a special switch on the dashboard of the automobile. The various terminals marked 1 through 12 on the terminal strip 70 are adapted to be connected by the lead wires 74a through 74m to corresponding terminals 1 through 12 on the terminal block 75 which would be mounted on any suitable place on the auto desk as, for example, on the inside of one of the desk legs 14 and 15 or in the wiring compartment 48. The plurality of lead wires 74a through 74m would be bound into one multiple wire cable indicated by the numeral 74 in FIGS. 2 and 3. The lead wires 74a through 74m may thus be used for either conducting power to an attachment or for both conducting power to an attachment and for connecting the attachment to the ground side of the battery 73. The numeral 76 indicates a fuse board for fusing the indicator lights 54, 56 and 58 in the desk light 60. The lead wires 74a through 74m are connected to the terminals on the contact block 75, which correspond to the similar numbered terminals on the terminal strip 70, by any suitable means.

If it is desired to energize the siren 72, the switch lever 77 would be thrown to the lower position marked "Siren," whereby current would be sent to the siren 72 by use of the horn button 115 in the following described manner. Siren relay control current would flow through the lead wire 78a from the battery 73 and into the conventional starter relay 116 and through the ground lead wire 82 to the terminal 3 on the block 70 and thence through lead wire 74c to the block 75. The ground circuit is then completed by means of the lead wire 81, switch blade 80, lead wire 79, to number 2 lead on block 75, thence through lead wire 74b to block 70 and to ground through horn button 115 when it is depressed. Horn button 115 is thus used to selectively, alternately energize the horn or the siren. When siren relay 116 is energized as thus described, current for energizing the siren passes from the battery 73, through the lead wire 78a, the relay 116 and thence through the siren 72 and back to ground through lead wire 83. Simultaneously, the switch blade 84 would energize the signal lamp 54 in the following described manner. Current passes from the battery through the lead wire 78 and into the terminal 5 on the terminal strip 70. Current then passes through the lead wire 74e into the corresponding terminal 5 on the block 75. The current then passes through the lead wire 85, the fuse 86 and the lead wire 87 and through the switch blade 84. The lead wire 88 thence conducts the current through to the lamp 54 from whence the lamp 54 is connected by means of the lead wires 89, 90 and 91 to the terminal 9 on the block 75. The lead wire 74i connects the terminals 9 on the block 75 and the terminal strip 70. As shown in FIG. 5, the terminal 9 on the terminal strip 70 is connected to the ground side of the battery 73.

If it is desired to energize the horn 71, the switch 77 is thrown to the upper position whereby the horn button 115 may be depressed to actuate the horn relay 117. Horn relay control current will then flow from the battery 73 through the lead wire 78a to the horn relay 117 and thence to ground through the following circuit. From the relay 117 the horn relay control circuit passes through the lead wire 93, which is connected to terminal 1 on block 70, through lead wire 74a to terminal 1 on block 75, thence through lead wire 92, switch blade 80, lead wire 79, to terminal 2 on block 75, and thence through lead wire 74b to terminal 2 on block 70, and thence to horn button 115 and to ground. When the switch 77 is moved to the center or neutral position, neither the siren or the horn will operate.

If the operators of the automobile wish to energize the usual beacon or flasher which is carried on top of the patrol car, the switch 95 is closed whereby the beacon will be energized and the signal light 56 will be energized. When the switch 95 is closed, power or current will be sent to the beacon by means of the lead wire 78 which is connected to the terminal 6 on the terminal strip 70. Current then flows to the lead wire 74f to the terminal 6 on the block 75. Current then passes through the lead wire 96 and the fuse 97 and into the lead wire 98. Current then flows through the switch blade 95 and through the lead wire 99 to the terminal 4 on the block 75. Current then passes through the lead wire 74d to the terminal 4 on the terminal strip 70 from whence it is conducted by means of the lead wire 100 to the conventional beacon, to one side thereof, and the other side of the beacon is connected to the ground side of the battery in the usual manner and in the same manner as shown for the horn 71 and siren 72. The current simultaneously flows from the switch 95 through the lead wire 101 and to the one side of the signal light 56. The other side of the signal light 56 is connected to the ground side of the battery by means of the lead wires 89, 90, 91 and 74i.

The switch 57 on the switch panel 51 is also operated in a similar manner to energize the hood light which is normally mounted on the hood of a patrol car. When the switch blade 102 is closed, current passes from the battery 73 through the lead wire 78, and to the terminal 5 on the terminal strip 70. Current then flows through the lead wire 74e to the terminal 5 in the block 75. The current then flows through the lead wire 85, the fuse 86 and the lead wire 103 to the switch blade 102. Current then flows through the blade 102 and into the lead wire 104, the lead wire 105 and the lead wire 74g to one side of the hood lamp. The other side of the hood lamp would be connected to the ground side of the battery 73 in the usual manner. Current simultaneously flows from the lead wire 104 down through the lead wire 106 into one side of the signal light 58. The other side of the signal light 58 is connected by means of the lead wires 107, 90, 91 and 74i to the ground side of the battery 73.

The desk light 60 may be energized by closing the switch blade 108. The current then flows from the battery 73 and through the lead wire 78, the lead wire 74e, the lead wire 85 and through the fuse 109. The current then passes through the lead wire 110, the switch blade 108, thence through the lead wire 111 to one side of the desk lamp 60. The other side of the desk lamp 60 is connected by means of the lead wire 112, the lead wire 91 and the lead wire 74i to the ground side of the battery 73.

It will be seen that the auto desk and the control system incorporated therein provides a very useful and practical device for patrol automobiles, whereby much special wiring and switches and signal lights are eliminated as a permanent fixture in a patrol car. The various switches and signal lights and the control wiring needed therefor may be incorporated in the wiring areas and compartment of the auto desk, whereby the switches and wiring may be used again and again. It will be understood that the auto desk of the present invention may be inserted or installed in a new patrol automobile with a minimum of expense and time. Experience has shown that the auto desk of the present invention is a very efficient device. It will be understood that the contacts on the terminal strip 70 and the block 75 which are not used, as for example, terminals 8, 10, 11 and 12, may be used for other attachments than those shown.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What I claim is:

1. In a patrol vehicle provided with accessories such as a siren, beacon light, hood light, and a horn, and having a front seat and a floor adjacent said seat, an accessory control desk comprising:
   (a) a body portion disposed on the front seat,
   (b) supporting means connected at one end thereof to the body portion and provided with means at the other end thereof for connection to the vehicle floor, and
   (c) an electric control system, including switch means and signal indicators, mounted in said body portion for connection to said accessories for controlling the operation thereof.

2. In a patrol vehicle provided with accessories such as a siren, beacon light, hood light, and a horn, and having a front seat and a floor adjacent said seat, an accessory control desk comprising:
   (a) a body portion disposed on the front seat,
   (b) supporting means connected at one end thereof to the body portion and provided with means at the other end thereof for connection to the vehicle floor,
   (c) an electric control system, including switch means and signal indicators, mounted in said body portion for connection to said accessories for controlling the operation thereof,
   (d) said body portion including a storage compartment and a control system wiring compartment, and
   (e) said body portion further including a control panel disposed over a part of said wiring compartment for enclosing the same and having mounted thereon said switch means of the electric control system.

3. In a patrol vehicle provided with accessories such as a siren, beacon light, hood light, and a horn, and having a front seat and a floor adjacent said seat, an accessory control desk comprising:
   (a) a body portion disposed on the front seat,
   (b) supporting means connected at one end thereof to the body portion and provided with means at the other end thereof for connection to the vehicle floor,
   (c) an electric control system, including switch means and signal indicators, mounted in said body portion for connection to said accessories for controlling the operation thereof,
   (d) said body portion including a storage compartment and a control system wiring compartment,
   (e) said body portion further including a control panel disposed over a part of said wiring compartment for enclosing the same and having mounted thereon said switch means of the electric control system,
   (f) said body portion further including bracket means for mounting accessories on the same, and
   (g) a top surface member enclosing the upper side of said body portion and providing a work table for the operator of the patrol vehicle.

4. In a patrol vehicle provided with accessories such as a siren, beacon light, hood light, and a horn, and having a front seat and a floor adjacent said seat, an accessory control desk comprising:
   (a) a body portion disposed on the front seat,
   (b) supporting means connected at one end thereof to the body portion and provided with means at the other end thereof for connection to the vehicle floor,
   (c) an electric control system, including switch means and signal indicators, mounted in said body portion for connection to said accessories for controlling the operation thereof, (d) said body portion including a storage compartment and a control system wiring compartment, (e) said body portion further including a control panel disposed over a part of said wiring compartment for enclosing the same and having mounted thereon said switch means of the electric control system, (f) said body portion further including bracket means for mounting accessories on the same, (g) a top surface member enclosing the upper side of said body portion and providing a work table for the operator of the patrol vehicle, and (h) said electric control system including a terminal strip for attachment to the vehicle for operatively connecting said accessories to a power source in the vehicle.

References Cited in the file of this patent
UNITED STATES PATENTS

| | | |
|---|---|---|
| 2,515,633 | Coley | July 18, 1950 |
| 2,717,988 | Myers | Sept. 13, 1955 |